(12) United States Patent
Nakano

(10) Patent No.: US 8,672,004 B2
(45) Date of Patent: Mar. 18, 2014

(54) PNEUMATIC TIRE HAVING BLOCK TYPE TREAD PATTERN

(75) Inventor: Keita Nakano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 710 days.

(21) Appl. No.: 12/873,792

(22) Filed: Sep. 1, 2010

(65) Prior Publication Data

US 2011/0094640 A1    Apr. 28, 2011

(30) Foreign Application Priority Data

Oct. 28, 2009   (JP) ................................. 2009-248039

(51) Int. Cl.
*B60C 11/11* (2006.01)

(52) U.S. Cl.
USPC ...................................................... 152/209.8

(58) Field of Classification Search
USPC .......................................... 152/209.8, 209.9
See application file for complete search history.

(56) References Cited

U.S. PATENT DOCUMENTS

| 2006/0151078 | A1 | 7/2006 | Colombo et al. | |
| 2011/0094640 | A1* | 4/2011 | Nakano | 152/209.18 |
| 2011/0094642 | A1* | 4/2011 | Nakano | 152/209.23 |

FOREIGN PATENT DOCUMENTS

| EP | 0 688 686 A2 | 12/1995 |
| EP | 1 992 503 A1 | 11/2008 |
| JP | 2008-037260 A | * 2/2008 |

OTHER PUBLICATIONS

Machine translation for Japan 2008-037260 (no date).*
European Application No. 10 01 3898 Search Report dated Feb. 24, 2011.

* cited by examiner

*Primary Examiner* — Steven D Maki
(74) *Attorney, Agent, or Firm* — Birch, Stewart, Kolasch & Birch, LLP

(57) ABSTRACT

A pneumatic tire comprises a tread portion provided with: an inside circumferential groove (3) near the tread edge (Ti); 1st axial grooves (4) extending from the inside circumferential groove (3) toward the tire equator (C); oblique grooves (5) extending from the respective 1st axial grooves (4) to the outside tread edge (To), while inclining to the opposite direction to the intended tire rotational direction (R); 2nd axial grooves (6) extending from the inside circumferential groove (3) to the oblique grooves (5); and connecting grooves (7) extending between the oblique grooved 5. The tread portion (2) is provided with bent blocks (B1) each made up of an axial part (11) and oblique part (12). The bent point (E1) of the bent block (B1) is positioned on the inside tread edge side of the tire equator (C), and the axial distance (L1) therebetween is 0.10 to 0.25 times the tread width (TW).

5 Claims, 8 Drawing Sheets

PNEUMATIC TIRE HAVING BLOCK TYPE TREAD PATTERN

BACKGROUND OF THE INVENTION

The present invention relates to a pneumatic tire, more particularly to a tread pattern capable of significantly improving the traction/braking performance and lateral grip performance during running off the road.

Usually, off-road sport tires used in rally, dirt trial and the like are provided with block-type tread patterns in order to obtain superior road grip performance such as traction/braking performance and lateral grip performance.

In the European patent application publication No. EP1992503A1, a pneumatic tire is provided with an asymmetrical tread pattern in order to improve the traction performance and lateral grip performance, wherein the outside part of the tread portion to be placed on the outside of a vehicle is provided with: a plurality of oblique grooves extending from the outside tread edge to the tire equator while inclining to the intended rotational direction, and a plurality of connecting grooves extending between the oblique grooves while inclining to the same direction as the oblique grooves. On the other hand, the inside part of the tread portion to be placed on the inside of the vehicle is provided with circumferential grooves and axial grooves which extends generally in the tire circumferential direction and axial direction, respectively.

By such groove arrangement, the traction performance and lateral grip performance are improved, but it was found that there is room for improvement in the lateral grip performance and traction/braking performance.

SUMMARY OF THE INVENTION

It is therefore, an object of the present invention to provide a pneumatic tire, in which the lateral grip performance and traction/braking performance during running off the road in rally, dirt trial and the like can be effectively improved.

According to the present invention, a pneumatic tire has a block-type tread pattern for which a tire mounting position with respect to a vehicle (left side or right side) and a tire rotational direction are specified, and comprises a tread portion having a pair of tread edges which are an outside tread edge and an inside tread edge to be placed on the outside and inside of the vehicle, the tread portion provided with an inside circumferential groove extending circumferentially of the tire near the inside tread edge;

a plurality of 1st axial grooves extending from the inside circumferential groove toward the tire equator, and circumferentially arranged at intervals in the tire circumferential direction;

a plurality of oblique grooves extending from the respective 1st axial grooves to the outside tread edge, while inclining to the opposite direction to the tire rotational direction;

a plurality of 2nd axial grooves one disposed between the circumferentially adjacent two of the 1st axial grooves, and extending from the inside circumferential groove to the oblique grooves; and a plurality of connecting grooves extending between every two of the oblique grooved, wherein the tread portion is provided with bent blocks each defined by the circumferentially adjacent two of the oblique grooves, the inside circumferential groove, one of the 1st axial grooves, one of the 2nd axial grooved and one of the connecting grooved, each of the bent blocks is made up of an axial part extending from the inside circumferential groove towards the tire equator, and an oblique part between the oblique grooves, a bent point of each of the bent blocks, which is defined as an intersection point between the widthwise center line of the axial part with the widthwise center line of the oblique part, is positioned on the inside tread edge side of the tire equator, and the axial distance between the bent point and the tire equator is in a range of not less than 0.10 times, but not more than 0.25 times a tread width between the outside tread edge and an inside tread edge.

Here, the tread edges are the axial outermost edges of the ground contacting patch (camber angle=0) in a normally inflated loaded condition.

The normally inflated loaded condition is such that the tire is mounted on a standard wheel rim and inflate to a standard pressure and loaded with a standard tire load.

The tread width is the axial distance between the tread edges measured in a normally inflated unloaded condition of the tire.

The normally inflated unloaded condition is such that the tire is mounted on the standard wheel rim and inflate to the standard pressure but loaded with no tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the abovementioned table in TRA or the like.

In this application including specification and claims, various dimensions, positions and the like of the tire refer to those under the normally inflated unloaded condition of the tire unless otherwise noted.

DESCRIPTION OF THE PREFERRED EMBODIMENTS

Embodiments of the present invention will now be described in detail in conjunction with the accompanying drawings.

Figure 1:
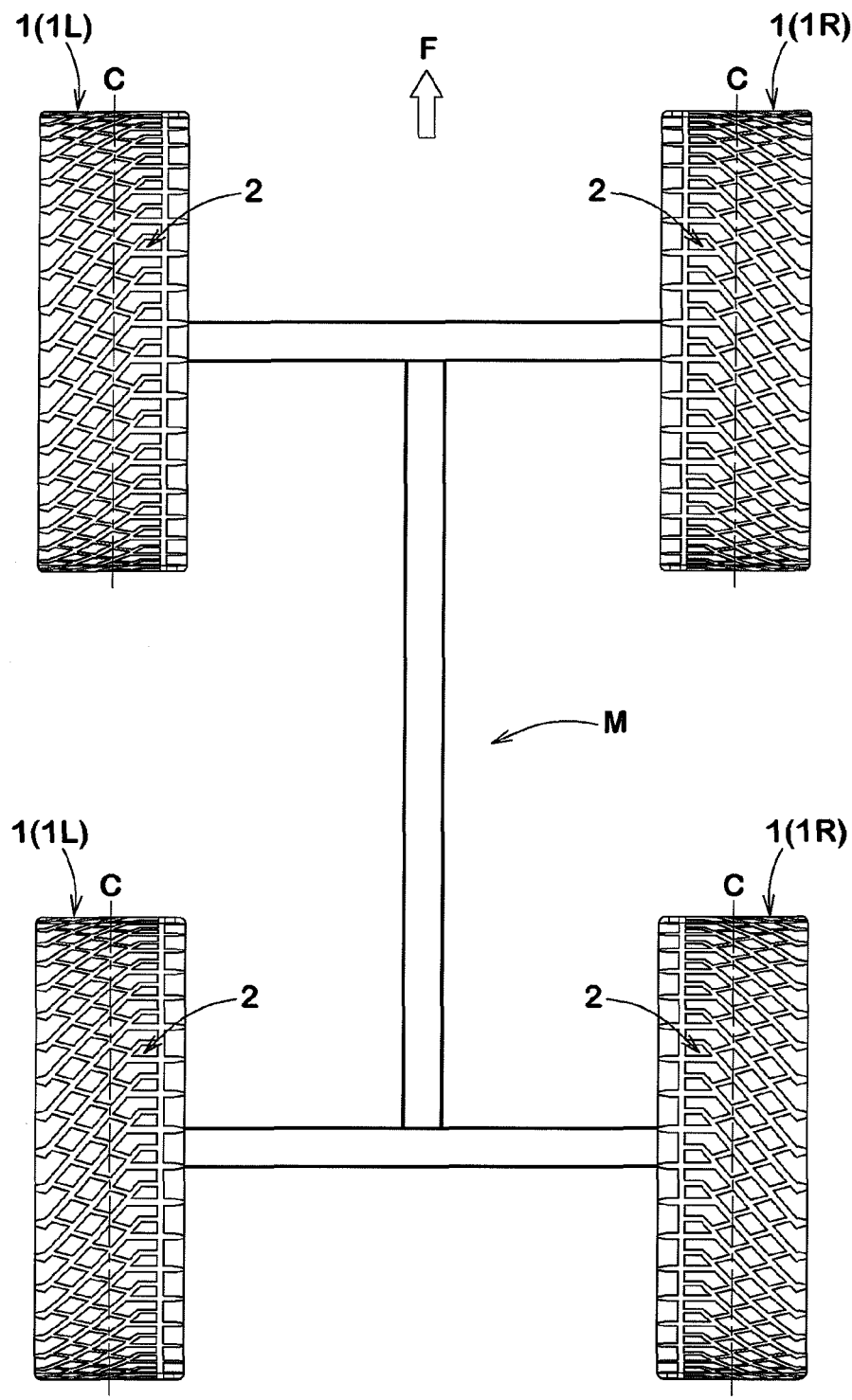
FIG. 1 shows an arrangement of pneumatic tires according to the present invention designed for a four-wheeled vehicle when viewed from above the vehicle.

According to the present invention, pneumatic tire 1 comprises a tread portion 2, a pair of sidewall portions, a pair of axially spaced bead portions, a carcass extending between the bead portions, and a tread reinforcing cord slayer disposed radially outside the carcass in the tread portion as usual. But, the tire mounting position (namely, right side or left side of the vehicle) and the tire rotational direction are specified. Therefore, as shown in FIG. 1, pneumatic tire 1 according to the present invention includes a left-hand tire 1L and a right-hand tire 1R for use on the left side and the right side of a vehicle M, respectively. Reference sign "F" denotes the travelling direction (Forward).

The left-hand tire 1L and right-hand tire 1R have respective tread patters which are unidirectional tread patters for which a tire rotational direction is specified. The intended tire mounting position (left side or right side) and tire rotational direction R are indicated in the tire sidewall portion (not shown) by the use of characters and/or marks.

The tread portion 2 has an inside tread part 2i defined between the tire equator c and the inside tread edge Ti to be located inward of the vehicle, and an outside tread part 2o defined between the tire equator C and the outside tread edge To to be located outward of the vehicle.

In this embodiment, the tires 1L and 1R are designed for a four-wheeled vehicle M for running on rough terrains which is provided with negative camber, namely, in the front view of the vehicle, the wheels (especially front wheels) are inclined toward the inside of the vehicle.

In the case of the vehicle M having negative camber, during straight running, the ground pressure of the inside tread part 2i becomes increased in comparison with the outside tread part 2o.

The tread portion 2 in this embodiment is provided with:
an inside circumferential groove 3 extending circumferentially of the tire near the tread edge Ti;
a plurality of 1st axial grooves 4 extending from the inside circumferential groove 3 toward the tire equator C, and circumferentially arranged at intervals in the tire circumferential direction;
a plurality of oblique grooves 5 extending from the respective 1st axial grooves 4 to the outside tread edge To, while inclining to the opposite direction to the tire rotational direction R;
a plurality of 2nd axial grooves 6 one disposed between the circumferentially adjacent two of the 1st axial grooves 4, and extending from the inside circumferential groove 3 to the oblique grooves 5; and
a plurality of connecting grooves 7 extending between every two of the oblique grooved 5.

Therefore, the tread portion 2 is provided with a plurality of blocks B defining a block pattern which is asymmetrical about the tire equator C and is different between the inside tread part 2i and outside tread part 2o.

As to the groove widths W1, W2, W3, W4 and W5 of the grooves 3, 4, 5, 6 and 7, if they are too narrow, it is difficult to provide good traction on muddy roads and sandy roads. If they are too wide, on the other hand, the land ratio decreases, and it is difficult to provide good traction/braking performance on gravel roads and hard earthen roads.
Therefore, the groove widths W1, W2, W3, W4 and W5 are preferably set in a range of not less than 5 mm, more preferably not less than 8 mm, but not more than 15 mm, more preferably not more than 13 mm.
Further, the groove depths of the grooves 3, 4, 5 and 7 are preferably set in a range of not less than 8.0 mm, but not more than 15.0 mm for the similar reasons.

The inside circumferential groove 3 in this example is a straight groove whose width W1 is constant. The distance TR from the inside tread edge Ti to the inside edge 3e of the inside circumferential groove 3 is preferably set in a range of from 0.05 to 0.10 times the tread width TW between the tread edges Ti and To.

Therefore, by the straight edges of the inside circumferential groove 3, lateral grip performance during cornering can be effectively improved.

Aside from the inside circumferential groove 3, there is no other circumferential groove extending straight or substantially straight in the tire circumferential direction in order to maintain high block rigidity and to prevent uneven wear and tearing-off of the blocks.

During cornering, the tire on the outside of turning is increased in the ground pressure in the outside tread part 2o than the inside tread part 2i, but the tire on the inside of turning is increased in the ground pressure in the inside tread part 2i than the outside tread part 2o. If a circumferential groove is disposed in the outside tread part 2o, especially, near the outside tread edge To, the car is liable to overturn during high speed cornering because the tire on the outside of turning is strongly resist to side-skid.

By disposing the inside circumferential groove 3 near the inside tread edge Ti, the tire on the inside of turning can resist against side-skid. But, the overturning of the car is prevented because the tire on the inside of turning is subjected to a drag force. Therefore, in this embodiment, the inside circumferential groove 3 is the only one circumferential groove. There is no groove which extends in a substantially straight or slightly zigzagged configuration.

The tread portion 2 in this embodiment is further provided with inside axial grooves 8.

The inside axial grooves 8 are arranged at intervals in the tire circumferential direction, and each extend in the tire axial direction from the inside circumferential groove 3 beyond the inside tread edge Ti.

The width W6 and depth of the inside axial grooves 8 are set in the same ranges as those for the grooves 3, 4, 5, 6 and 7. In this embodiment, all of the inside axial grooves 8 have a constant same width W6.

The angles of the inside axial grooves 8 with respect to the axial direction are preferably not more than 20 degrees, more preferably not more than 10 degrees, still more preferably not more than 5 degrees. In this embodiment, all of the inside axial grooves 8 have a same angle of 0 degree.

Figure 4:
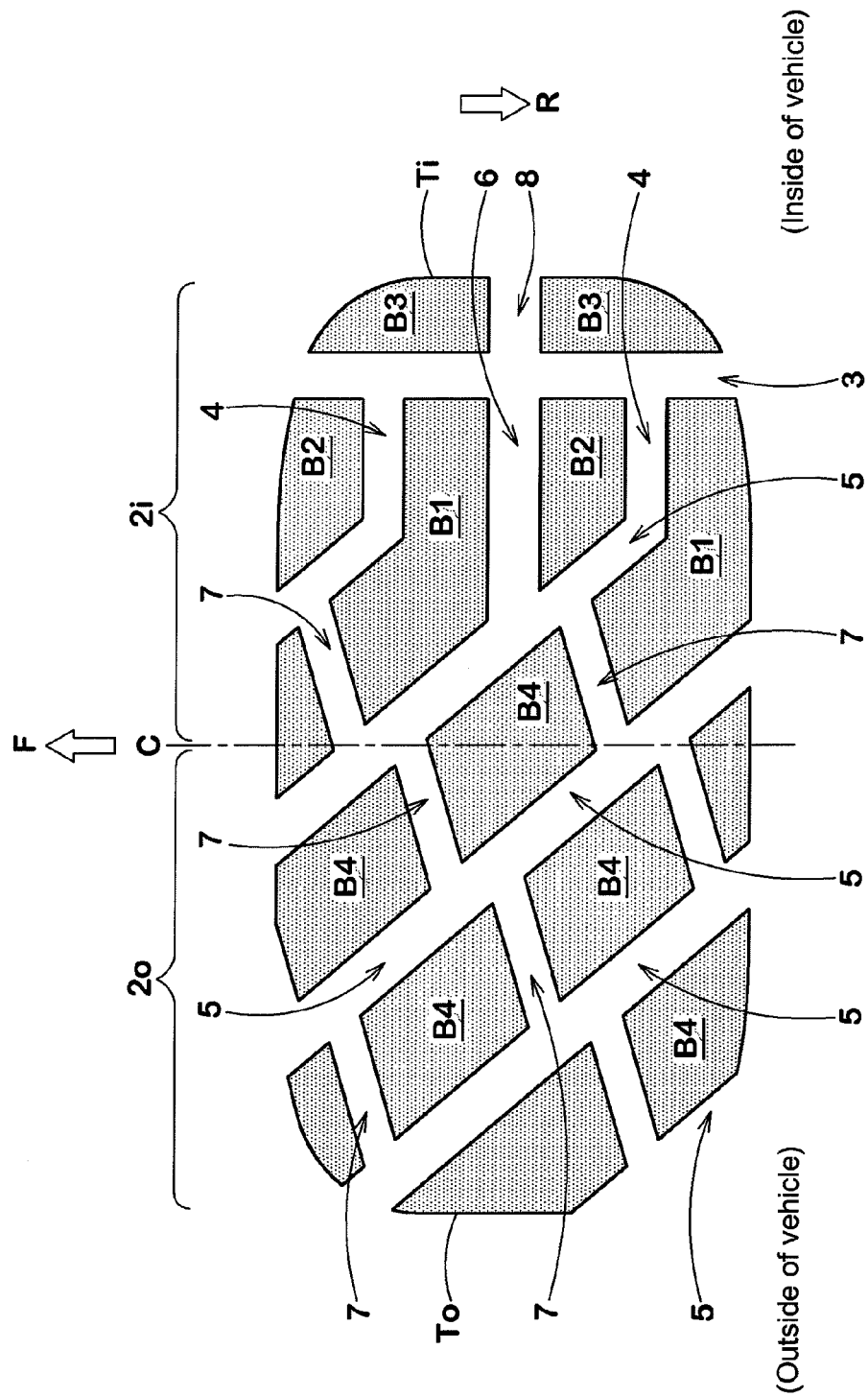
FIG. 4 is a foot print of the left-hand pneumatic tire during straight running.

During straight running, as shown in FIG. 4, the edges of the inside axial grooves 8 become substantially perpendicular to the traveling direction F of the car, thereby the traction/braking performance can be improved.

The 1st axial grooves 4 each have an outside end and an inside end, wherein the outside end is positioned on the inside tread edge side of the tire equator C, and the inside end is connected to the inside circumferential groove 3 at a circumferential position between the inside axial grooves 8. The angles of the 1st axial grooves 4 with respect to the axial direction are preferably not more than 20 degrees, more preferably not more than 10 degrees, still more preferably not more than 5 degrees, most preferably 0 degree.

In this embodiment, all of the 1st axial grooves 4 have a same angle of 0 degree, and a constant same width W2.

During straight running, as shown in FIG. 4, the edges of the 1st axial grooves 4 become substantially perpendicular to the traveling direction F of the car, thereby the traction/braking performance can be improved.

The oblique grooves 5 each have an inside end an outside end, wherein the inside end is connected to the outside end of one of the 1st axial grooves 4, and the outside end is opened at the outside tread edge To.

Figure 2:
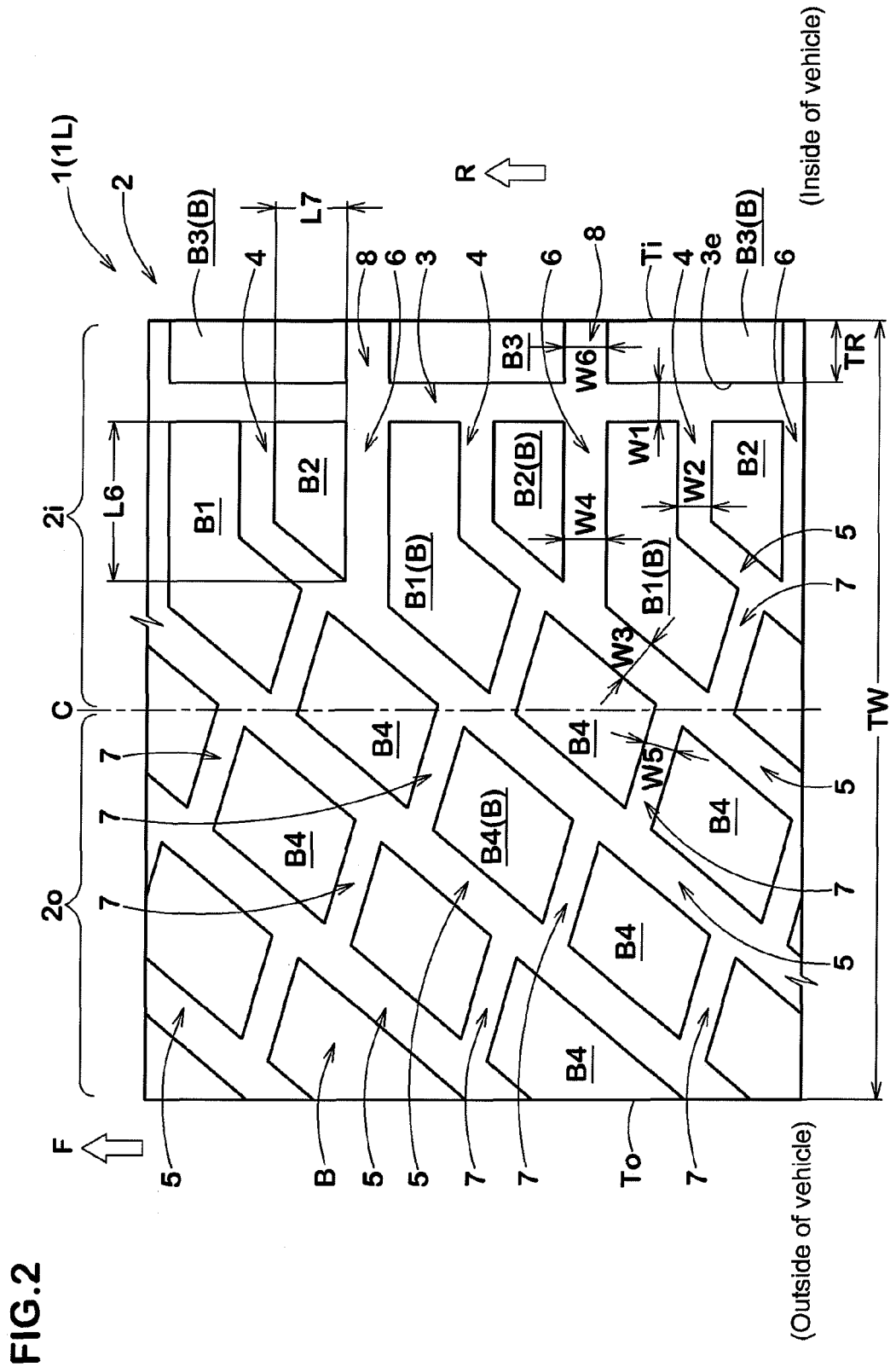
FIG. 2 is a developed partial top plan view of the left-hand pneumatic tire showing the tread portion.
Figure 3:
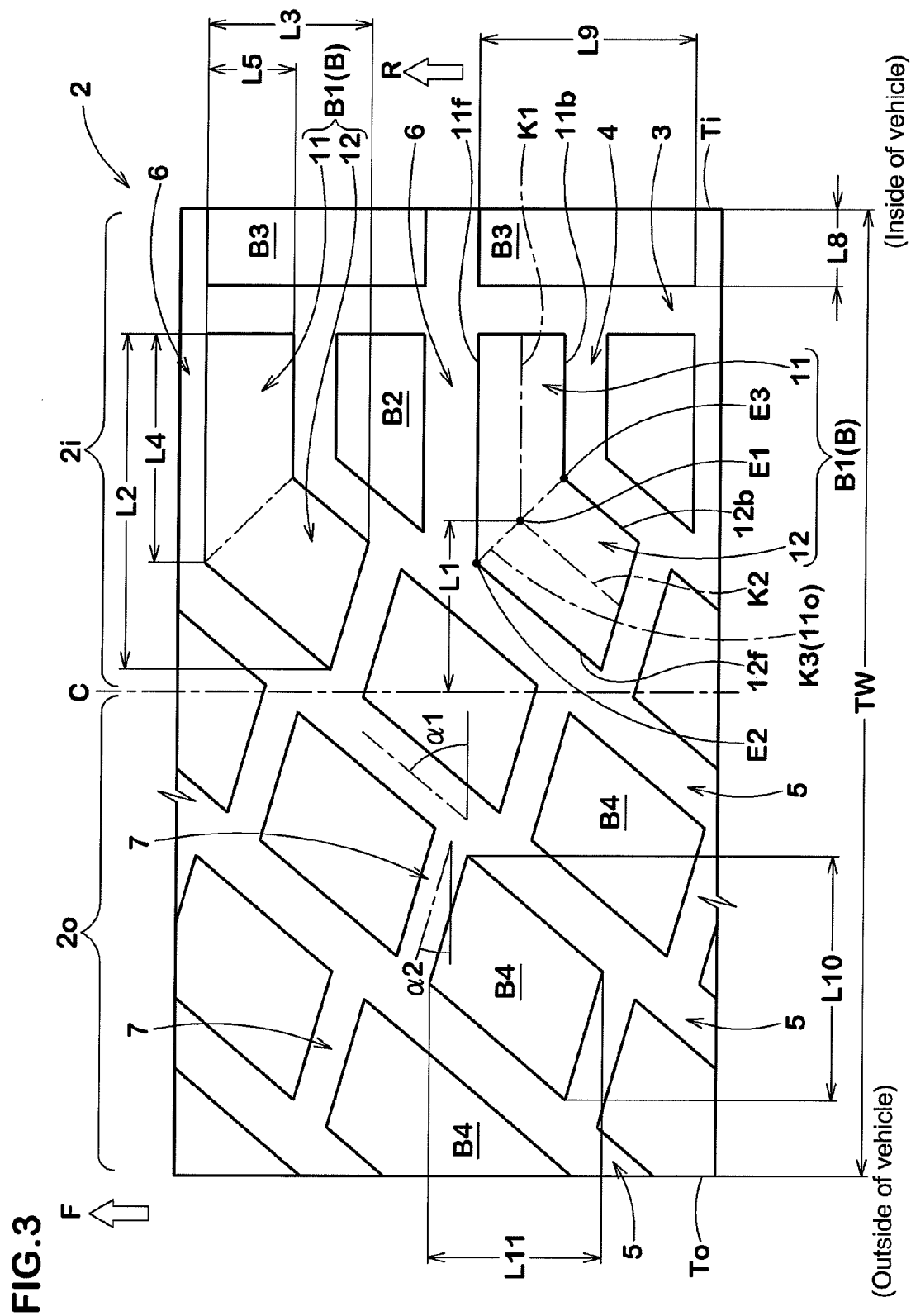
FIG. 3 is a magnification of a part of FIG. 2.

Each of the oblique grooves 5 extends straight from its inside end to the outside end, while inclining to the opposite direction to the tire rotational direction R as shown in FIG. 2. As shown in FIG. 3, the angles $\alpha 1$ of the oblique grooves 5 with respect to the axial direction are preferably set in a range of not less than 45 degrees, more preferably not less than 50 degrees, but not more than 60 degrees, more preferably not more than 55 degrees.

In this embodiment, all of the oblique grooves 5 have a constant same width W3 and a same angle $\alpha 1$.

Figure 5:
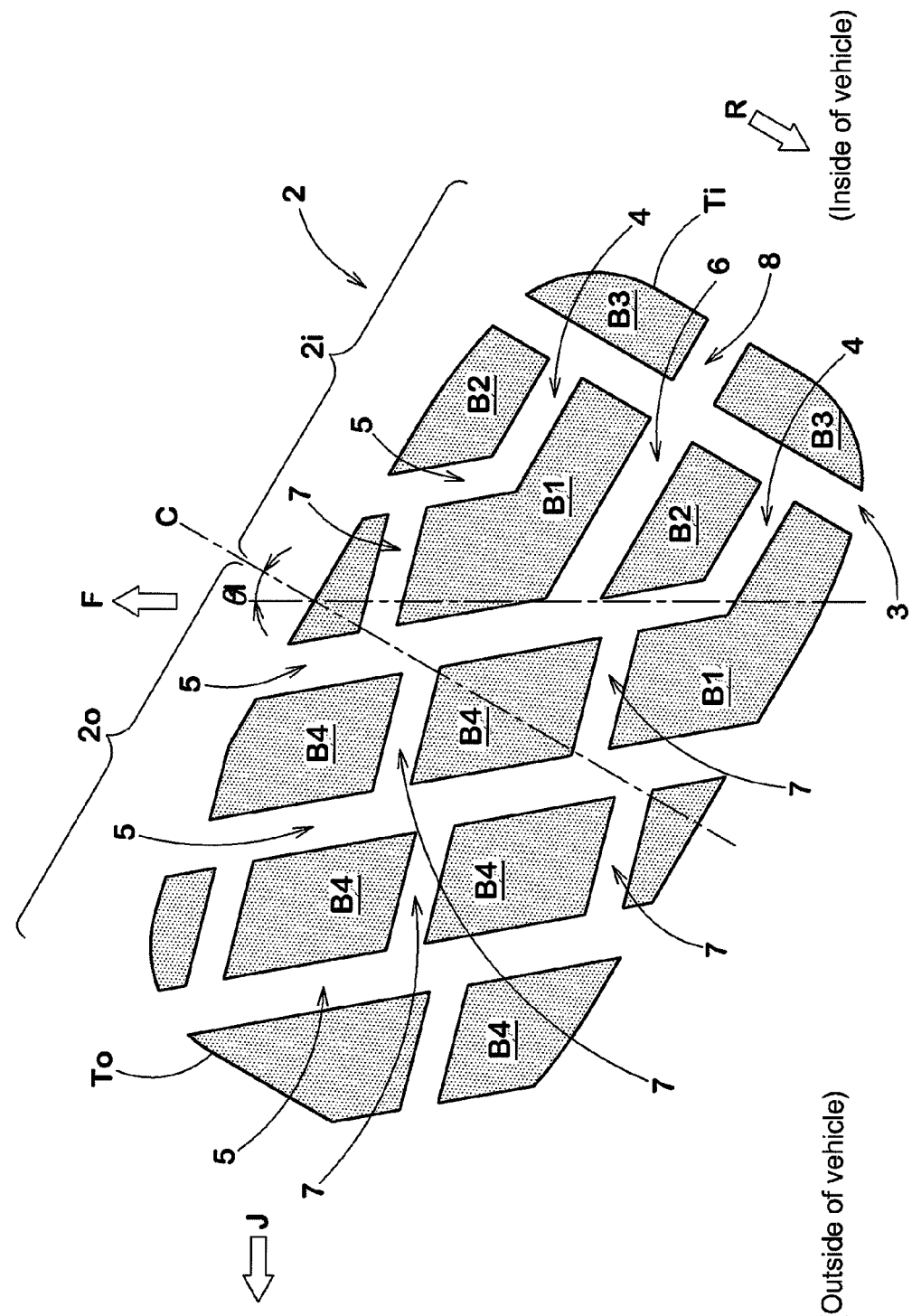
FIG. 5 is a foot print of the left-hand pneumatic tire during cornering.

During cornering, as shown in FIG. 5, when the tire on the outside of turning is applied to a slip angle $\theta 1$ (between the traveling direction F and the tire equator C), the oblique grooves 5 becomes substantially perpendicular or close to perpendicular to a side-skid direction 3, and strongly resist against the side-skid, thereby the lateral grip performance can be improved.

The 2nd axial grooves 6 each have an inside end and an outside end, wherein the inside end is connected to the inside circumferential groove 3, and the outside end is connected to one of the oblique grooves 5 at an axial position between the tire equator C and the inside end of the oblique groove 5 as shown in FIG. 2. Thus, the 2nd axial grooves 6 are longer than the 1st axial grooves 4.

The inside ends of the 2nd axial grooves 6 are substantially aligned with the outside ends of the inside axial grooves 8. Therefore, the 2nd axial grooves 6 are coupled with the respective inside axial grooves 8, through the inside circumferential groove 3.

The angles of the 2nd axial grooves 6 with respect to the axial direction are preferably not more than 20 degrees, more preferably not more than 10 degrees, still more preferably not more than 5 degrees, most preferably 0 degree.

In this embodiment, all of the 2nd axial grooves 6 have a constant same width W4 and a same angle of 0 degree. Therefore, the 2nd axial grooves 6 can improve the traction/braking performance during straight running.

As to the connecting grooves 7, three or more of them are disposed between every two adjacent oblique grooves 5 so as to extend therebetween, wherein the number of the connecting grooves 7 is not less than 3, preferably not less than 4.

With respect to each of the oblique grooves 5, the connecting grooves 7 on both sides thereof are staggered in order that the axially adjacent ends of the connecting grooves 7 are not aligned with each other.

The connecting grooves 7 are inclined to the opposite direction to the oblique grooves 5.

The angles $\alpha 2$ of the connecting grooves 7 with respect to the axial direction are preferably set in a range of not less than 10 degrees, more preferably not less than 15 degrees, but not more than 35 degrees, more preferably not more than 30 degrees. In this embodiment, all of the connecting grooves 7 have a constant same width W5 and a same angle $\alpha 2$.

By limiting the angles $\alpha 2$ in the above range, the axial component of the edges of the connecting groove 7 becomes larger than the circumferential component, and as shown in FIG. 4, during straight running, the edges of the connecting grooves 7 intersect with the traveling direction F at relatively large angles and thereby can improve the traction/braking performance. Further, the oblique blocks B4 which are defined by the oblique grooves 5 and the connecting grooves 7 are increased in the torsional rigidity. As a result, in a transitional period from straight running to cornering initial stage of slip angle $\theta 1$, the oblique blocks B4 can resist against torsional deformation, and thereby produce a large lateral force to realize a quick steering response.

The above-mentioned blocks B include a V-shaped (or L-shaped) bent block B1 between every two adjacent oblique grooves 5 as shown in FIG. 3.

The bent blocks B1 are each defined by two of the oblique grooves 5, the inside circumferential groove 3, one of the 1st axial grooves 4, one of the 2nd axial grooved 6 and one of the connecting grooved 7. Thereby, each of the bent blocks B1 is made up of an axial part 11 extending from the inside circumferential groove 3 towards the tire equator C, and an oblique part 12 extending along the oblique grooves 5.

The bent point E1 of the bent block B1, which is defined as the intersection point between the widthwise center line K1 of the axial part 11 with the widthwise center line K2 of the oblique part 12, is positioned on the inside tread edge Ti side of the tire equator c.

The axial distance L1 between the bent point E1 and the tire equator C is set in a range of not less than 0.10 times, preferably not less than 0.15 times, but not more than 0.25 times, preferably not more than 0.20 times the tread width TW.

The axial maximum width L2 of the bent block B1 is preferably set in a range of not less than 0.25 times, more preferably not less than 0.30 times, but not more than 0.45 times, more preferably not more than 0.40 times the tread width TW.

The axial maximum width L2 of the bent block B1 is preferably set in a range of not less than 1.5 times, more preferably not less than 1.8 times, but not more than 2.8 times, more preferably not more than 2.6 times the circumferential maximum length L3 of the bent block B1.

The axial maximum width L4 of the axial part 11 is preferably set in a range of not less than 0.65 times, more preferably not less than 0.68 times, but not more than 0.75 times, more preferably not more than 0.72 times the axial maximum width L2 of the bent block B1.

The circumferential maximum length L5 of the axial part 11 is preferably set in a range of not less than 0.45 times, more preferably not less than 0.50 times, but not more than 0.60 times, more preferably not more than 0.55 times the circumferential maximum length L3 of the bent block B1.

As the bent block B1 is a combination of the axial part 11 having a high axial rigidity and the oblique part 12 having a high circumferentially rigidity, the bent block B1 as whole exerts high rigidity in both directions.

As the bent blocks B1 are formed in axial positions where the ground pressure is relatively high, the axial part 11 and oblique part 12 can effectively exert their advantages. More specifically, during straight running, as shown in FIG. 4, the traction/braking performance can be improved by the edges of the axial parts 11.

Due to the negative camber, the ground pressure of the axial parts during straight running is increased, therefore, the effect of the edges of the axial parts 11 is furthered. During cornering, on the other hand, as shown in FIG. 5, in the tire on the outside of turning, the ground pressure of the oblique parts 12 is relatively increased, therefore, the edges of the oblique parts 12 can effectively improve the lateral grip performance.

If the bent points E1 of the bent blocks B1 are positioned near the tire equator C, the straight running stability, especially high-speed straight running stability is liable to deteriorate.

If the axial maximum width L2 is less than 0.25 times the tread width TW, the axial rigidity of the bent block decreases, and it becomes difficult to improve the traction/braking performance. If the axial maximum width L2 is more than 0.45 times the tread width TW, it becomes difficult to improve both of the traction/braking performance and lateral grip performance.

The above-mentioned blocks B further include a plurality of substantially trapezoidal blocks B2 each defined by the inside circumferential groove 3, one of the 1st axial grooves 4, one of the 2nd axial grooves 6 and one of the oblique grooves 5. The trapezoidal blocks B2 are one disposed between the axial parts 11 of circumferentially adjacent two of the bent blocks B1.

As shown in FIG. 2, the axial maximum width L6 of the trapezoidal block B2 is preferably set in a range of not less than 0.10 times, more preferably not less than 0.15 times, but not more than 0.30 times, more preferably not more than 0.25 times the tread width TW.

Further, the axial maximum width L6 is preferably set in a range of not less than 1.5 times, more preferably not less than 2.0 times, but not more than 3.5 times, more preferably not more than 3.0 times the circumferential maximum length L7 of the trapezoidal block B2.

Accordingly, the toe-side edge and heel-side edge of the trapezoidal block B2 can improve the traction/braking performance during straight running.

As the axial width of the trapezoidal block B2 gradually increases towards the opposite direction to the tire rotational direction R, it is possible to improve the traction performance during straight running since the deformation of the block is reduced.

As shown in FIG. 3, the tread portion 2 further includes circumferentially long blocks B3 each defined by the inside circumferential groove 3, the inside tread edge Ti, and circumferentially adjacent two of the inside axial grooves 8. The circumferentially long blocks B3 each have an axial maximum width L8, and a circumferential maximum length L9 more than the axial maximum width L8.

The axial maximum width L8 is preferably set in a range of not less than 0.03 times, more preferably not less than 0.05 times, but not more than 0.15 times, more preferably not more than 0.10 times the tread width TW.

The axial maximum width L8 is preferably set in a range of not less than 0.30 times, more preferably not less than 0.35 times, but not more than 0.45 times, more preferably not more than 0.40 times the circumferential maximum length L9.

In this embodiment, all of the circumferentially long blocks B3 have a constant same axial width (equal to the maximum width L8) and substantially same circumferential lengths (as a maximum length L9).

During cornering, as shown in FIG. 5, in the tire on the inside of turning, the inside edge (inside tread edge Ti) and outside edge of the circumferentially long block B3 can improve the lateral grip performance.

The blocks B further include the oblique blocks B4 defined by the oblique grooves 5 and connecting grooves 7. Therefore, with respect to each of the oblique grooves 5, the oblique blocks B4 on both sides thereof are staggered. And the oblique blocks B4 are inclined to the opposite direction to the tire rotational direction R when viewed from the inside tread edge towards the outside tread edge.

Therefore, the oblique blocks B4 shown in FIG. 3 include trapezoidal oblique blocks on the outside most, parallelogram oblique blocks on the inside most, and parallelogram oblique blocks therebetween.

The axial maximum width L10 of the oblique block B4 is preferably set in a range of not less than 0.15 times, more preferably not less than 0.20 times, but not more than 0.30 times, more preferably not more than 0.25 times the tread width TW.

Further, the axial maximum width L10 is preferably set in a range of not less than 1.0 times, more preferably not less than 1.3, but not more than 2.0 times, more preferably not more than 1.5 times the circumferential maximum length L11 of the oblique block B4.

The most inside oblique blocks B4 are intersected by the tire equator C, and each of them is positioned such that two corners of the block at the respective circumferential ends of the block are positioned in the vicinity of the tire equator C, and the axial distances of the two corners from the tire equator C are at most 10 mm.

The ground pressure is relatively high in the vicinity of the tire equator C, therefore, the corners of the block dig into the road surface, and thereby the traction/braking performance can be further improved.

Figure 6:
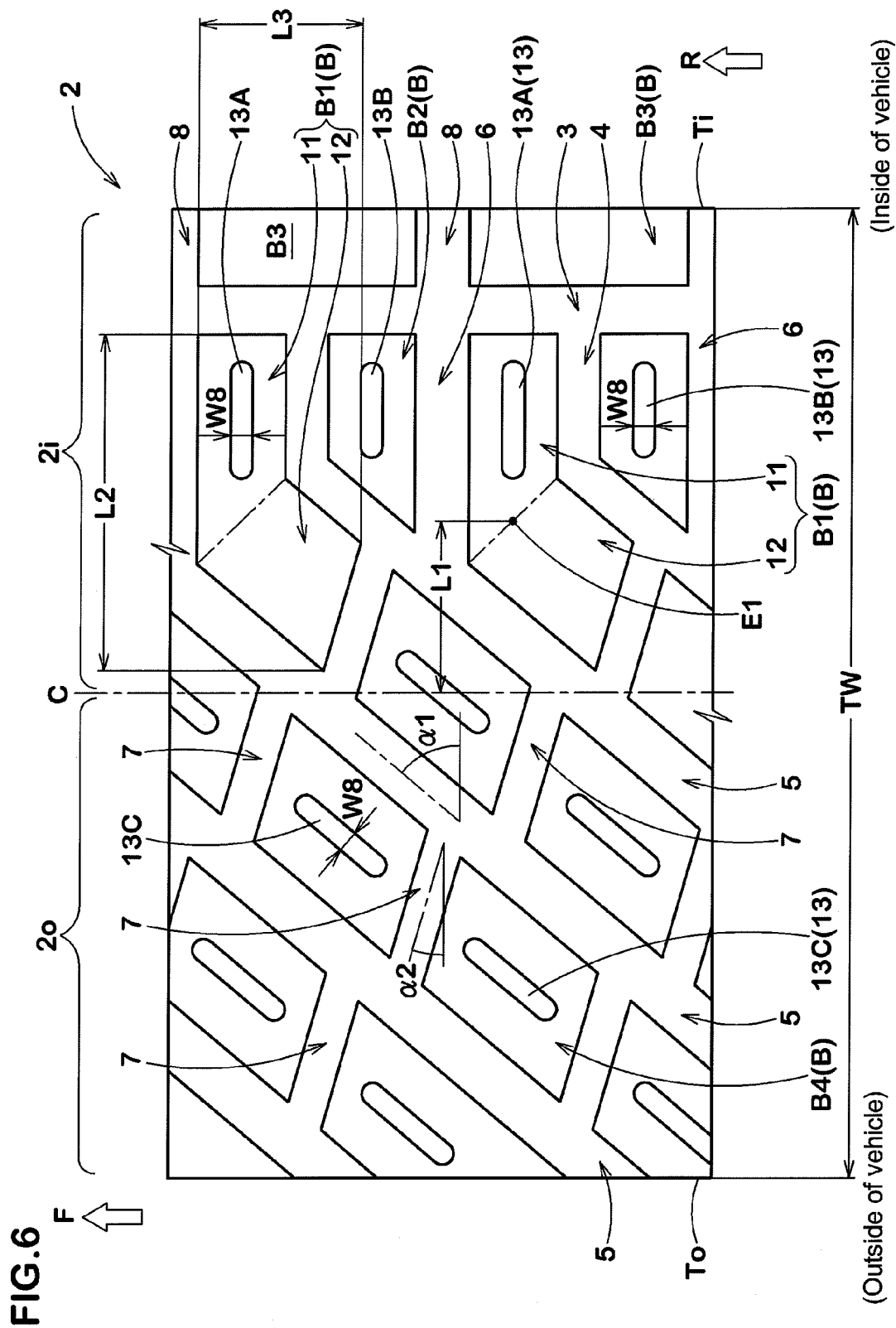
FIG. 6 is a developed partial top plan view of another embodiment of the present invention.

FIG. 6 shows a modification of the tread pattern shown in FIGS. 2 and 3, wherein the blocks B are provided with shallow grooves 13 each terminated within the respective blocks B.

The shallow grooves 13 have a depth of from 1.0 to 3.0 mm, and a width W8 of from 1.0 to 5.0 mm.

In this embodiment, the shallow grooves 13 include: first shallow grooves 13A disposed on the axial parts 11 of the bent blocks B1; second shallow grooves 13B disposed on the trapezoidal blocks B2; and third shallow grooves 13C disposed on the oblique blocks B4.

The first and second shallow grooves 13A and 13B extend along the widthwise center lines of the blocks B1 and B2 substantially in parallel with the 1st and 2nd axial grooves 4 and 6. The third shallow grooves 13C extend along the widthwise center lines of the blocks B4 substantially in parallel with the oblique grooves 5.

Therefore, the first and second shallow grooves 13A and 13B can improve the traction/braking performance. The third shallow grooves 13C can improve the lateral grip performance.

Comparison Tests

Figure 7:
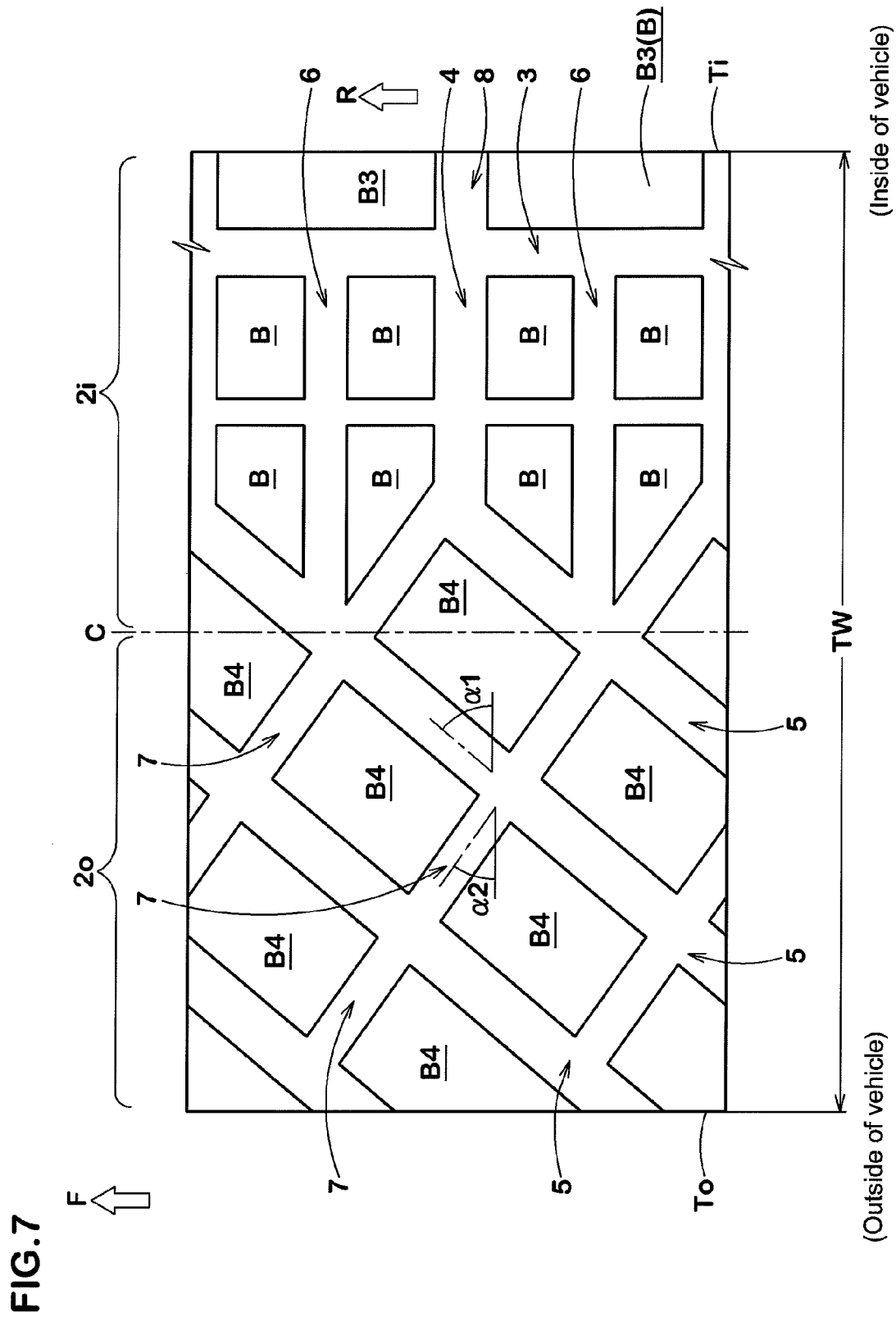
FIG. 7 is a developed partial top plan view of a comparative tire.
Figure 8:
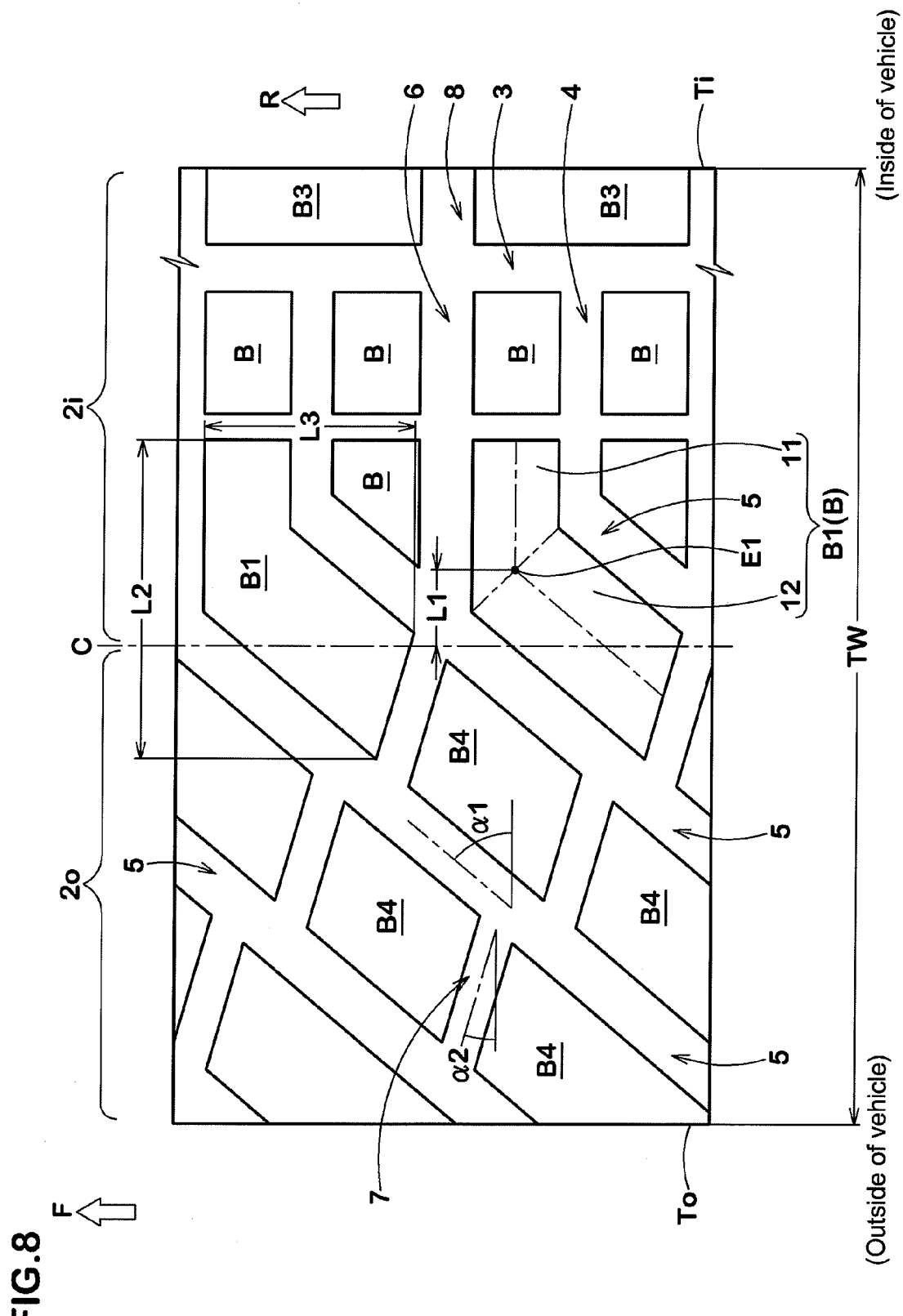
FIG. 8 is a developed partial top plan view of another comparative tire.

Pneumatic tires having tread patterns shown in FIGS. 3, 7 and 8 having specifications shown in Table 1 were made and tested.

Common specifications are as follows.
tire size: 205/60R15
wheel rim size: 7JX15
tread width TW: 190 mm
Inside Circumferential Groove
width W1: 9.0 mm
depth: 11.5 mm
1St Axial Groove
width W2: 8.0 mm
depth: 11.5 mm
2nd Axial Groove
width W4: 10.0 mm
depth: 11.5 mm
Oblique Groove
width W3: 10.0 mm
depth: 11.5 mm
Connecting Groove
width W5: 7.3 mm
depth: 11.5 mm
Inside Axial Groove
width W6: 10.0 mm
depth: 11.5 mm
(1) Vehicle Running Test;
2000 cc 4WD car (negative camber: 1.5 degrees) provided on the four wheels with the same test tires (tire pressure: 210 kPa) was run on an off-road test circuit course of 2.5 km and time trial was made twice. At the same time, the test driver evaluated the following test items into five ranks. The larger the rank number, the better the performance. The results are shown in Table 1.
- traction/braking performance (soft road, hard road)
- straight running stability
- braking performance (soft road, hard road)
- braking stability
- responsiveness (initial stage of cornering)
- behavioral stability (initial stage of cornering)
- front wheel lateral grip performance (middle stage of cornering)
- rear wheel lateral grip performance (middle stage of cornering)
- steering response (middle stage of cornering)
- traction/braking performance (final stage of cornering) balance between front and rear (final stage of cornering)
- responsiveness (high speed running) balance between front and rear (high speed running)
- rigidity
- ground contact
- controllability
- reaction from road surface From the test results, it was confirmed that both of the traction/braking performance and lateral grip performance can be effectively improved.

TABLE 1

| Tire | Ref.1 | Ref.2 | Ref.3 | Ex. 1 |
| --- | --- | --- | --- | --- |
| Tread pattern | FIG.7 | FIG.8 | FIG.3 | FIG.3 |
| Number of Circumferential grooves | 2 | 2 | 1 | 1 |
| Land ratio (%) | 54.5 | 56.4 | 57.1 | 57.1 |
| Bent block | | | | |
| Axial distance L1 (mm) | — | 14.5 | 54.0 | 32.0 |
| L1/TW | — | 0.08 | 0.30 | 0.18 |
| Axial maximum width L2 | — | 63.0 | 63.0 | 63.0 |
| L2/TW | — | 0.35 | 0.35 | 0.35 |
| Circum. maximum length L3 (mm) | — | 31.0 | 56.0 | 31.0 |
| L2/L3 | — | 2.0 | 1.1 | 2.0 |
| Oblique groove | | | | |
| Angle α1 (deg.) | 50 | 50 | 50 | 50 |
| Connecting groove | | | | |
| Angle α2 (deg.) | 35 | 15 | 15 | 15 |
| Test results | | | | |
| Lap time 1st | 1'39.01 | 1'38.65 | 1'39.53 | 1'37.63 |
| Lap time 2nd | 1'39.00 | 1'40.89 | 1'39.32 | 1'38.52 |
| traction/braking performance (soft road) | 3.0 | 3.0 | 2.5 | 4.0 |
| traction/braking performance (hard road) | 3.0 | 2.5 | 3.0 | 3.0 |
| straight running stability | 3.0 | 2.5 | 3.0 | 4.0 |
| braking performance (soft road) | 3.0 | 2.5 | 2.5 | 4.0 |
| braking performance (hard road) | 3.0 | 2.5 | 3.0 | 4.0 |
| braking stability | 3.0 | 2.5 | 2.5 | 4.0 |
| responsiveness (cornering initial stage) | 3.0 | 2.0 | 3.0 | 4.0 |
| behavioral stability (cornering initial stage) | 3.0 | 2.0 | 2.0 | 4.0 |
| front wheel lateral grip performance (middle stage of cornering) | 3.0 | 2.0 | 3.0 | 4.0 |
| rear wheel lateral grip performance (middle stage of cornering) | 3.0 | 2.0 | 3.5 | 5.0 |
| steering response (middle stage of cornering) | 3.0 | 1.0 | 3.0 | 5.0 |
| traction/braking performance (final stage of cornering) | 3.0 | 2.0 | 2.0 | 4.0 |
| balance between front and rear (final stage of cornering) | 3.0 | 2.0 | 3.0 | 5.0 |
| responsiveness (high speed running) | 3.0 | 2.5 | 3.0 | 4.0 |
| balance between front and rear (high speed running) | 3.0 | 2.5 | 3.0 | 4.0 |
| rigidity | 3.0 | 2.5 | 3.0 | 4.0 |
| ground contacting | 3.0 | 2.5 | 3.0 | 4.0 |
| controllability | 3.0 | 2.0 | 2.5 | 5.0 |
| reaction from road surface | 3.0 | 2.0 | 3.0 | 4.0 |

The invention claimed is:

1. A pneumatic tire having a block-type tread pattern for which a tire mounting position with respect to a vehicle and a tire rotational direction are specified, comprising
a tread portion having a pair of tread edges which are an outside tread edge and an inside tread edge,
the tread portion provided with:
an inside circumferential groove extending circumferentially of the tire near the inside tread edge;
a plurality of 1st axial grooves extending from the inside circumferential groove toward the tire equator, and circumferentially arranged at intervals in the tire circumferential direction;
a plurality of oblique grooves extending from the respective 1st axial grooves to the outside tread edge, while inclining to one circumferential direction corresponding to the opposite direction to the tire rotational direction;
a plurality of 2nd axial grooves one disposed between the circumferentially adjacent two of the 1st axial grooves, and extending from the inside circumferential groove to the oblique grooves; and
a plurality of connecting grooves extending between every two of the oblique grooves,
wherein
with respect to each of the oblique grooves, the connecting grooves on both sides thereof are staggered so that the axially adjacent ends of the connecting grooves are not aligned with each other,
the connecting grooves are inclined to one circumferential direction corresponding to the tire rotational direction toward the outside tread edge from the inside tread edge,
the angles of the connecting grooves with respect to the tire axial direction are not less than 10 degrees, but not more than 35 degrees,
the tread portion is provided with bent blocks each defined by the circumferentially adjacent two of the oblique grooves, the inside circumferential groove, one of the 1st axial grooves, one of the 2nd axial grooves and one of the connecting grooves,
each of the bent blocks is made up of an axial part extending from the inside circumferential groove towards the tire equator, and an oblique part between the oblique grooves,
a bent point of each of the bent blocks, which is defined as an intersection point between the widthwise center line of the axial part with the widthwise center line of the oblique part, is positioned on the inside tread edge side of the tire equator, and
the axial distance between the bent point and the tire equator is in a range of not less than 0.10 times, but not more than 0.25 times a tread width between the outside tread edge and an inside tread edge,
the tread portion is further provided with a plurality of inside axial grooves arranged at intervals in the tire circumferential direction and extending from the inside circumferential groove to the inside tread edge so as to form circumferentially long blocks each defined by the inside circumferential groove, the inside tread edge, and two circumferentially adjacent inside axial grooves.

2. The pneumatic tire according to claim 1, wherein
the tread portion is provided with a plurality of substantially trapezoidal blocks each defined by the inside circumferential groove, one of the 1st axial grooves, one of the 2nd axial grooves and one of the oblique grooves, and
the trapezoidal blocks are disposed one between the axial parts of circumferentially adjacent two of the bent blocks.

3. The pneumatic tire according to claim 1, wherein
the tread portion is provided with oblique blocks defined by the oblique grooves and the connecting grooves, and
the oblique blocks are inclined to said one circumferential direction corresponding to the opposite direction to the tire rotational direction when viewed from the inside tread edge toward the outside tread edge.

4. The pneumatic tire according to claim 1, wherein
the axial maximum width of each of the bent blocks is not less than 1.5 times, but not more than 2.8 times the circumferential maximum length of the bent block.

5. The pneumatic tire according to claim 1, wherein
the angles of the oblique grooves with respect to the tire axial direction are not less than 45 degrees, but not more than 60 degrees.

* * * * *